United States Patent
Reymond et al.

(10) Patent No.: US 7,910,215 B2
(45) Date of Patent: Mar. 22, 2011

(54) ANTIREFLECTION-COATED TRANSPARENT SUBSTRATE EXHIBITING NEUTRAL COLOR IN REFLECTION

(75) Inventors: Vincent Reymond, Antony (FR); Estelle Martin, Saint-Denis (FR)

(73) Assignee: Saint-Gobain Glass France, Courbevoie (FR)

( * ) Notice: Subject to any disclaimer, the term of this patent is extended or adjusted under 35 U.S.C. 154(b) by 179 days.

(21) Appl. No.: 12/282,263

(22) PCT Filed: Feb. 23, 2007

(86) PCT No.: PCT/FR2007/050842
§ 371 (c)(1),
(2), (4) Date: Sep. 9, 2008

(87) PCT Pub. No.: WO2007/104874
PCT Pub. Date: Sep. 20, 2007

(65) Prior Publication Data
US 2009/0104385 A1    Apr. 23, 2009

(30) Foreign Application Priority Data
Mar. 10, 2006 (FR) .................................. 06 50811

(51) Int. Cl.
| E06B 3/06 | (2006.01) |
| B32B 9/00 | (2006.01) |
| F21V 9/00 | (2006.01) |
| G02B 1/11 | (2006.01) |

(52) U.S. Cl. .......... 428/428; 428/34; 428/432; 428/699; 428/701; 428/702; 359/359; 359/586; 359/588; 52/786.1

(58) Field of Classification Search .................... 428/34, 428/426, 428, 432, 699, 701, 702, 216; 359/359, 359/361, 580, 589, 586, 588; 52/786.1
See application file for complete search history.

(56) References Cited

U.S. PATENT DOCUMENTS

| 5,728,456 A * | 3/1998 | Adair et al. .................... 428/216 |
| 6,068,914 A | 5/2000 | Boire et al. |
| 6,924,037 B1 | 8/2005 | Joret et al. |
| 2006/0165963 A1 | 7/2006 | Fleury et al. |

FOREIGN PATENT DOCUMENTS

| FR | 2 748 743 | 11/1997 |
| FR | 2 800 998 | 5/2001 |
| WO | 2004 005210 | 1/2004 |
| WO | 2005 016842 | 2/2005 |

* cited by examiner

Primary Examiner — Donald Loney
(74) Attorney, Agent, or Firm — Oblon, Spivak, McClelland, Maier & Neustadt, L.L.P.

(57) ABSTRACT

Transparent especially glass, substrate (6) having at least on one of its sides an antireflection coating made from a stack (A) of thin dielectric layers of alternating high and low refractive indices, characterized in that the stack comprises, in succession: a high-index first film (1) having a refractive index $n_1$ between 1.8 and 2.3 and a geometrical thickness $e_1$ of between 10 and 25 nm; a low-index second film (2) with a refractive index $n_2$ of between 1.40 and 1.55 and a geometrical thickness $e_2$ of between 20 and 50 nm; a high-index third film (3) with a refractive index $n_3$ of between 1.8 and 2.3 and a geometrical thickness $n_3$ of between 110 and 150 nm; and a low-index fourth film (4) with a refractive index $n_4$ of between 1.40 and 1.55 and a geometrical thickness $e_4$ of between 60 and 95 nm, the algebraic sum of the geometrical thickness $e_3+e_1$ being between 125 and 160 nm.

24 Claims, 2 Drawing Sheets

ANTIREFLECTION-COATED TRANSPARENT SUBSTRATE EXHIBITING NEUTRAL COLOR IN REFLECTION

The invention relates to a transparent substrate, especially made of glass, intended to be incorporated into glazing and equipped, on at least one of its faces, with an antireflection coating.

An antireflection coating usually consists of a multi-layer comprising interferential thin layers, generally an alternation of layers based on a dielectric material of high refractive index and a dielectric material of low refractive index. When deposited on a transparent substrate, the function of such a coating is to reduce its light reflection and to increase its light transmission. A substrate thus coated will therefore have its transmitted light/reflected light ratio increased, thereby improving the visibility of objects placed behind it. When it is sought to achieve a maximum antireflection effect, it is then preferable to provide both faces of the substrate with this type of coating.

There are many applications for this type of product: it may be used for windows in buildings, or for glazing in sales furniture, for example as a store display cabinet and as architectural curved glass, in order to better distinguish what is in the window, even when the interior lighting is low compared to the exterior lighting. It may also be used as glass for counters.

Examples of antireflection coatings are described in Patents EP 0 728 712 and WO 97/43224.

Most antireflection coatings developed hitherto have been optimized to minimize light reflection at normal incidence. It is thus known that, at normal incidence, very low light reflection values $R_L$ may be obtained with multilayers comprising four layers with a high-index layer/low-index layer/high-index layer/low-index layer alternation. The high-index layers are generally made of $TiO_2$ which effectively has a very high index, of around 2.45 and the low-index layers are usually made of $SiO_2$.

Other important properties which are the mechanical durability of the multilayer and the resistance of the product to heat treatments are rarely taken into account. Similarly, the optical appearance and the esthetics of the glazing seen from an oblique angle, that is to say from a non-zero angle of incidence, are very rarely dealt with in the antireflection glazing units sold at present.

The appearance in reflection, especially the intensity of the light reflection, is not however satisfactory as soon as one moves slightly away from viewing perpendicular to the glazing. The mechanical strength and the thermomechanical resistance of these type of multilayers are also not satisfactory.

Some solutions have been proposed to take into account an oblique viewing angle, but they too have not given complete satisfaction: it is possible, for example, to cite Patent EP-0 515 847 which proposes a multilayer comprising two layers of the $TiO_2+SiO_2/SiO_2$ type or comprising three layers of the $TiO_2+SiO_2/TiO_2/SiO_2$ type deposited via a sol-gel process, but which does not have a good enough performance. This deposition technique also has the drawback of producing multilayers of low mechanical strength.

Generally, the only antireflection coatings currently proposed for which the color in reflection moves substantially toward the neutral when the angle of observation increases, have:
  either a high light reflection under normal incidence;
  or mediocre mechanical strength and chemical resistance.

Patent Application WO 2004/005210 describes multilayers having both a low light reflection and good durability but that have a strong color variation in reflection, which may even range up to red, when the angle of observation varies.

Patent Application WO 2005/016842 describes multi-layers, for which at least one of the high-index layers comprises a mixed nitride of silicon and of zirconium, in which the silicon ions are partially substituted by zirconium ions. Such multilayers simultaneously have a low light reflection, a good durability and a low color variation in reflection when the angle of observation varies. However, tests carried out by the Applicant have shown that such multilayers, due to the presence itself of the zirconium substituent or dopant in a relatively large amount, that is to say typically having a degree of substitution of the cations by Zr greater than 5 mol %, exhibit a marked yellow appearance in transmission. For example, for the multilayer from Example 1 of this application, values of $a^*_{trans}=-1.5$; and $b^*_{trans}=4$ were measured in the C.I.E. color system, which did not permit a wide application, for example in the building field.

The present invention does not relate to multilayers having such a Zr substituent or dopant. Preferably, when they are not constituted of zirconium oxide $ZrO_2$, said layers are zirconium-free. In the sense of the present description, the term "zirconium-free" is understood to mean that Zr is only present in the layers in the form of inevitable impurities.

The objective of the invention is to overcome the above drawbacks, by seeking to develop an antireflection coating, that is to say of which the light reflection is less than 2% and preferably less than 1.5%, and which guarantees, at the same time, good esthetics of the glazing, whatever the angle of incidence, high mechanical durability and good resistance to heat treatments (annealing, toughening, bending, folding) and to do so without compromising the economic and/or industrial feasibility of its manufacture.

The invention relates to an antireflection multilayer having at least one sequence of four alternating layers, namely layers of high and low refractive indices.

Figure 1:
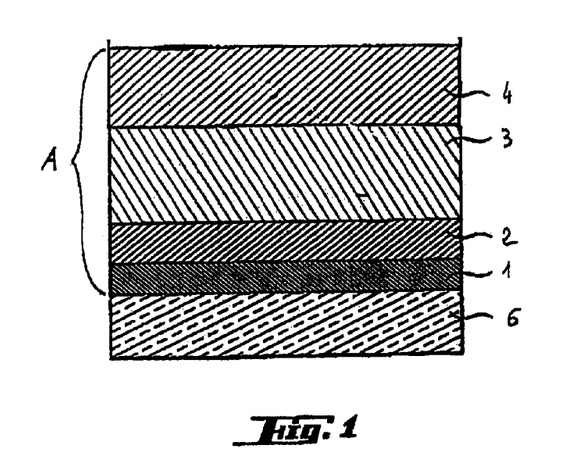
FIG. 1 is a substrate equipped on one of its two faces with a four-layer antireflection multilayer A according to the invention.

More specifically, one subject of the invention is a transparent substrate, especially a glass substrate, having, on at least one of its faces, an antireflection coating made of a thin-film multilayer (A) of dielectric material with alternating high and low refractive indices, especially having an antireflection effect at normal incidence, and that is defined in the following manner. It successively comprises, starting from the surface of the substrate:

a high-index first layer 1 having a refractive index $n_1$ of between 1.8 and 2.3 and a geometrical thickness $e_1$ of between 10 and 25 nm;

a low-index second layer 2 having a refractive index $n_2$ of between 1.40 and 1.55 and a geometrical thickness $e_2$ of between 20 and 50 nm;

a high-index third layer 3 having a refractive index $n_3$ of between 1.8 and 2.3 and a geometrical thickness $e_3$ of between 110 and 150 nm; and a low-index fourth layer 4 having a refractive index $n_4$ of between 1.40 and 1.55 and a geometrical thickness $e_4$ of between 60 and 95 nm, the algebraic sum of the geometrical thicknesses $e_3+e_1$ being between 125 and 160 nm.

Figure 2:
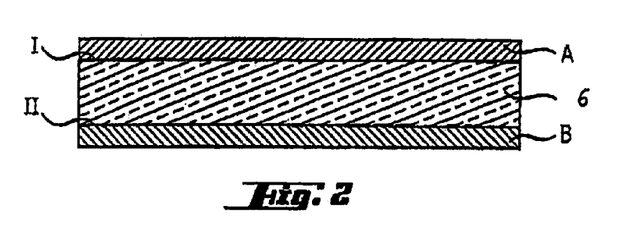
FIG. 2 is a substrate equipped on each of its faces I, II with a four-layer antireflection multilayer A and B according to the invention.

The multilayer (A) does not have a Zr substituent or dopant and it is present on at least one of the faces of said substrate, the other face being bare, covered with another coating having another functionality, for example of the solar-protection, antistatic, heating layer, anti-fogging, anti-rain or anti-soiling type, or else covered with another antireflection multilayer (A) as described previously, which may be different from or identical to the first.

All the refractive indices $n_1$ described in the present description are given at a wavelength of 550 nm.

Studies carried out by the Applicant have shown, as will be described subsequently, that such multilayers are, on the one hand, suitable for guaranteeing good esthetics of the substrate regardless of the angle of incidence and, on the other hand, capable of undergoing heat treatments.

Within the meaning of the invention, the term "layer" is understood to mean either a single layer, or a superposition of layers in which each of them satisfies the indicated refractive index and in which the sum of their geometrical thicknesses also remains the value indicated for the layer in question.

The best results and compromises between the various properties desired (such as described previously) have especially been obtained when at least one of the geometrical thicknesses and/or one of the indices of the four layers of the multilayer according to the invention have been chosen from the following intervals:

$n_1$ and/or $n_3$ are less than 2.2 and are advantageously between 1.85 and 2.15, especially between 1.90 and 2.10;

$e_1$ is between 12 and 20 nm;

$e_2$ is between 25 and 40 nm, preferably between 30 and 40 nm;

$e_3$ is between 115 and 135 nm;

$e_4$ is between 75 and 95 nm; and the sum $e_3+e_1$ is between 130 and 155 nm.

The layers according to the invention are generally made of a dielectric material, especially of the metal oxide, nitride or oxynitride type as will be explained in detail subsequently. It is not however excluded that at least one of them is modified so as to be at least slightly conducting, for example by doping a metal oxide, for example in order to give the antireflection multilayer an antistatic function too.

The invention preferably relates to glass substrates, but also applies to transparent substrates based on a polymer, for example polycarbonate.

The thickness and refractive index criteria adopted in the invention make it possible to obtain an anti-reflection effect over a broad low-light-reflection band, having a neutral tint in transmission and an attractive appearance in reflection, whatever the angle of incidence at which the thus coated substrate is observed.

The glass substrate according to the invention has a light reflection value $R_L$ at normal incidence that is very low, typically less than or equal to 2% or even 1.5% and a satisfactory colorimetry in oblique light reflection, that is to say a color for which the shade and intensity are considered as acceptable from an esthetic standpoint, and also a color that is substantially neutral in transmission, and to do so without compromising the properties of the multilayer with regard to mechanical durability and resistance to heat treatment.

More specifically:

The glass substrate coated on both its faces in accordance with the invention is especially characterized by a reduction of at least 6% in the value of $R_L$ in the visible range compared to the uncoated substrate. The choice of high-index materials having indices lower than those conventionally used, for example around 2.0, makes it possible to obtain good antireflection effects which have optical properties, in particular $R_L$ at normal incidence, that are comparable to, although slightly below, those obtained with materials for which the refractive index is conventionally around 2.45, in particular $TiO_2$.

The present substrate is characterized in reflection by values of a* and b* in the (L, a*, b*) colorimetry system such that a color that is usually almost neutral and at worst slightly green or blue under normal incidence is obtained (avoiding the red or yellow appearance that is judged to be unattractive in numerous applications, especially in the building field). Moreover, a change in the color toward absolute neutral is observed when the angle of observation varies, that is to say when the angle of incidence is not zero.

The shade of the substrate in transmission is neutral, avoiding a yellowish appearance that is judged to be unattractive in numerous applications, especially in the building field.

The properties of mechanical resistance (resistance to abrasion, scratching, cleaning) and of resistance to heat treatments (annealing, toughening, bending) of the stacks of layers of the transparent substrate are significantly increased, especially owing to the use of materials having a more moderate index such as $SnO_2$, $Si_3N_4$, $Sn_xZn_yO_z$, $TiZnO_x$ or $Si_xTi_yO_z$.

Moreover, still with respect to the $TiO_2$ used to date, these materials have, in addition to their better mechanical properties, the advantage of having deposition rates that are much higher when the deposition technique known as sputtering is used. In this moderate range of indices, there is also a larger choice of materials which may be deposited by sputtering, which offers more flexibility in the industrial manufacture and more possibilities for adding additional functionalities to the multilayer as will be explained in detail below.

The most suitable materials for forming the first and/or the third layer of the multilayer, that is to say those having a higher index, are for example based on metal oxide(s) chosen from the group composed of zinc oxide (ZnO), tin oxide ($SnO_2$), zirconium oxide ($ZrO_2$), mixed tin-zinc oxides ($Sn_xZn_yO_z$), mixed zinc-titanium oxides ($TiZnO_x$), or mixed silicon-titanium oxides ($Si_xTi_yO_z$) or based on nitride(s) chosen from the group composed of silicon nitride ($Si_3N_4$) and/or aluminum nitride (AlN). All these materials may optionally be doped to improve their properties of chemical and/or mechanical and/or electrical resistance.

For example, the high-index third layer is made from or comprises a mixed tin/zinc or silicon/titanium oxide.

The most suitable materials for forming the second and/or the fourth layer of the multilayer A, that is to say those having a low index, are based on silicon oxide, on silicon oxynitride and/or oxycarbide or else based on a mixed oxide of silicon and aluminum, for example of the $SiOAlF_x$ type. Such a mixed oxide tends to have a better durability, especially chemical durability, than pure $SiO_2$ (an example thereof is given in Patent EP 791 562). It is also possible to adjust the respective proportion of the two oxides to obtain the expected improvement in durability without increasing the refractive index of the layer too much.

These multilayers have, as will be described subsequently, an abrasion resistance such that the haze caused by a Taber test does not exceed around 3-4% and a resistance to heat treatments such that the product can be toughened or bent to radii of curvature of less than 1 meter and even in certain cases to radii of curvature of around 10 cm.

Thus, the substrates incorporating such layers in their multilayer stack may undergo, without damage, heat treatments such as annealing, toughening, bending or even folding. These heat treatments must not impair the optical properties and this functionality is important for the glazing for store counters as this is glazing that has to undergo high-temperature heat treatments of the bending, toughening, annealing, or laminating type, where the glass has to be heated to at least 120° C. (laminating) and up to 500 to 700° C. (bending, toughening). The fact of being able to deposit the thin layers before heat treatment without that posing any problem (depositing layers onto bent glass is tricky and expensive; it is far simpler from an industrial viewpoint to perform depositions before any heat treatment) then becomes of decisive benefit.

The bending may be done with a small radius of curvature (of around 1 m), or even with a very small radius of curvature (of around ten centimeters or so), typically for an application relating to store windows, store counters in particular.

Compared to the multilayers currently marketed, the multilayer according to the invention and most particularly the $SiO_2/Si_3N_4$ combination has the advantage of being stable to heat treatment, of allowing bending at small radii of curvature (R=1 m approximately); likewise the $SiO_2$/mixed tin-zinc or silicon-titanium oxides combination guarantees bending, or even folding, for very small radii of curvature (R=10 cm approximately). Moreover, these two combinations, which are the subject of the present invention, guarantee mechanical and chemical durability that are improved and are in any case greater than those obtained with a multilayer comprising $TiO_2$. Specifically, any multilayer from the prior art does not make it possible to obtain, at the same time, a color in reflection that is judged to be attractive at any angle of incidence, high properties of mechanical and chemical durability and an aptitude to undergo bending and/or folding without exhibiting major optical defects.

It is thus possible to have a single antireflection multilayer configuration regardless as to whether or not the carrier glass is intended to undergo a heat treatment. Even if it is not intended to be heated, it remains advantageous to use at least one nitride layer, as it improves the mechanical and chemical durability of the multilayer as a whole.

According to one particular embodiment, the first and/or the third layer, those having a high index, may in fact be made up of several superposed high-index layers. These may most particularly be a two-layer structure of the $SnO_2/Si_3N_4$ or $Si_3N_4/SnO_2$ type. The advantage of this is as follows: $Si_3N_4$ tends to be deposited a little less readily and a little more slowly than a conventional metal oxide such as $SnO_2$, ZnO or $ZrO_2$ by reactive sputtering. For the third layer in particular, which is the thickest and the most important for protecting the multilayer from any damage that may result from heat treatment, it may be advantageous to split the layer so as to deposit just enough thickness of $Si_3N_4$ to obtain the effect of protection against the desired heat treatment and to optically "make up" the layer using $SnO_2$ or ZnO.

The glass chosen for the substrate coated with the multilayer A according to the invention or for the other substrates which are associated with it in order to form a glazing unit may in particular be, for example, ultraclear glass of the Diamant type, or clear glass of the Planilux type or bulk-tinted glass of the Parsol type, three products that are sold by Saint-Gobain Vitrage, or else of the TSA or TSA++ type as described in Patent EP 616 883. It may also be glass optionally tinted as described in Patents WO 94/14716; WO 96/00194, EP 0 644 164 or WO 96/28394. It may filter radiation of the ultraviolet type.

Another subject of the invention is glazing units that incorporate the substrates equipped with the multilayer defined above. The glazing in question may be "mono-lithic", that is to say composed of a single substrate coated with the multilayer on one of its faces. Its opposite face may be devoid of any antireflection coating, being bare or covered with another coating that has another functionality. This may be a coating with a solar-protection function (using, for example, one or more silver layers surrounded by layers made of dielectric, such as metal oxides or nitrides, or made of metal alloys such as Ni—Cr), with a low-emissivity function (for example, made of doped metal oxide such as $SnO_2$:F or a tin-doped indium oxide ITO or one or more silver layers), with an antistatic function (a metal oxide that is doped or that is sub-stoichiometric in oxygen), a heating layer (doped metal oxide, Cu, Ag, for example) or an array of heating wires (copper wires or bands screen-printed from a conducting silver slurry), an anti-fogging function (using a hydrophilic layer), an anti-rain function (using a hydrophobic layer, for example based on a fluoropolymer), an anti-soiling function (photocatalytic coating comprising $TiO_2$ at least partially crystallized in anatase form).

Said opposite face may also be equipped with an antireflection multilayer, to maximize the desired anti-reflection effect. In this case, it is also an anti-reflection multilayer corresponding to the criteria of the present invention which may be either identical to or different from the first multilayer.

The substrate according to the invention may be provided on both of its faces with said antireflection multilayer.

Another advantageous glazing unit that incorporates a substrate coated according to the invention has a laminated structure, which combines two glass substrates using one or more sheets of thermoplastic such as polyvinyl butyral PVB. In this case, one of the two substrates is provided, on its outer face (on the opposite side from that where the glass joins the thermoplastic sheet), with the antireflection multilayer according to the invention, the other glass, again on the outer face, possibly being, as before, bare, coated with the same antireflection multilayer or with another type of antireflection multilayer (B), or else with a coating having another functionality as in the previous case (this other coating may also be positioned not on a face on the opposite side from the join, but on one of the faces of one of the rigid substrates which faces the thermoplastic joining sheet). The laminated glazing can thus be provided with a network of heating wires, with a heating layer or with a solar-protection coating "within" the laminate.

The invention also comprises glazing units equipped with the antireflection multilayer of the invention and which are multiple glazing units, that is to say that use at least two substrates separated by an intermediate gas-filled space (double or triple glazing). Here too, the other faces of the glazing unit may also be antireflection-treated or have another functionality. The multiple glazing unit, especially double glazing or glazing having a laminated structure, comprises at least two substrates, such as described previously. The two glass substrates are separated by an intermediate gas-filled space or joined together using a thermoplastic sheet. One of said substrates is equipped on its outer face, that is to say on the face on the opposite side from the thermoplastic sheet or from the gas-filled space, with the antireflection multilayer according to the invention. The other substrate, on its outer face, is bare, is coated with an antireflection multilayer of the same or different nature, or is coated with a coating having another functionality of the solar-protection, low-emissivity, anti-soiling, anti-fogging, anti-rain or heating type, and/or said coating having another functionality is placed on one of the faces of the substrates turned toward the thermoplastic joining sheet or toward the gas-filled space.

It should be noted that this other functionality may also consist in positioning on one and the same face the antireflection multilayer and the multilayer having another functionality (for example, by surmounting the antireflection coating with a very thin anti-soiling coating layer), the addition of this supplementary functionality not being, of course, to the detriment of the optical properties.

A process of manufacturing glass substrates with an antireflection coating according to the invention typically consists in depositing all of the layers, successively one after the other, via a vacuum technique, especially by magnetron sputtering or by corona discharge. Thus, it is possible to deposit the oxide layers by reactive sputtering of the metal in question in the presence of oxygen and the nitride layers in the presence of nitrogen. To produce $SiO_2$ or $Si_3N_4$, the starting point may be a silicon target that is slightly doped with a metal such as aluminum to make it sufficiently conductive. Typically, the layers are deposited conventionally by reactive magnetron sputtering in an oxidizing atmosphere starting from an Si or metal target to produce layers made of $SiO_2$ or made of metal oxide, starting from an Si or metal target in a nitriding atmosphere to produce nitrides, and in a mixed oxidizing/nitriding atmosphere to produce oxynitrides. The Si targets may contain a small amount of another metal, especially Zr, or Al, especially in order to make them more conducting.

Another subject of the invention is the applications of this glazing, most of which have already been mentioned: store window, display cabinet, store counter, interior or exterior glazing for buildings, for any display device such as anti-glare computer screens, televisions, any glass furniture, any decorative glass and roofs for motor vehicles. This glazing may be bent/toughened after deposition of the layers.

The details and advantageous features of the invention will now emerge from the following non-limiting examples, illustrated using the following figures:

FIG. 1 is a substrate equipped on one of its two faces with a four-layer antireflection multilayer A according to the invention; and FIG. 2 is a substrate equipped on each of its faces I, II with a four-layer antireflection multilayer A and B according to the invention.

EXAMPLES

Various four-layer antireflection multilayers were synthesized on a glass substrate according to the following process:

The layers were deposited successively one after the other by magnetron sputtering. The layers of $SiO_2$ and of $Si_3N_4$ were obtained by reactive sputtering of a silicon target slightly doped with metallic aluminum to make it sufficiently conducting, in the presence of oxygen for the $SiO_2$ layers and in the presence of nitrogen for the $Si_3N_4$ layers.

The multilayer stack of layers is the following, starting from the glass substrate 6, for all the examples:

| layer 1: | $Si_3N_4$ | index $n_1 = 2.0$ |
| layer 2: | $SiO_2$ | index $n_2 = 1.48$ |
| layer 3: | $Si_3N_4$ | index $n_3 = 2.0$ |
| layer 4: | $SiO_2$ | index $n_4 = 1.48$ |

The glass was a clear soda-lime-silicate glass with a thickness of 4 mm, sold under the name Planilux® by Saint-Gobain Vitrage. This glass was composed of monolithic glazing and was equipped on both of its faces with the antireflection multilayer described previously, according to the overview diagram from FIG. 2.

Table 1 below gives the geometrical thicknesses $e_i$, in nanometers, of each of the layers i, for the various multilayers:

TABLE 1

| Multilayer | $e_1$ (nm) | $e_2$ (nm) | $e_3$ (nm) | $e_4$ (nm) | $e_3 + e_1$ (nm) |
|---|---|---|---|---|---|
| 1 | 15 | 32 | 121 | 87 | 136 |
| 2 | 16 | 37 | 135 | 85 | 151 |
| 3 | 14 | 35 | 130 | 75 | 144 |
| 4 | 13 | 25 | 118 | 90 | 131 |
| 5 | 18 | 28 | 102 | 90 | 120 |
| 6 | 19 | 29 | 150 | 95 | 169 |

The multilayers of layers numbered 1 to 4 conform to the present invention. Multilayer No. 5 was identical to the multilayer described in example 2 of Patent Application WO 04/005210. Multilayer No. 6 did not conform to the invention and was given solely by way of comparison.

The various substrates thus covered were then evaluated by light reflection at normal and oblique incidence.

The results obtained are given in examples 1 to 6 below.

Example 1

Figure 3:
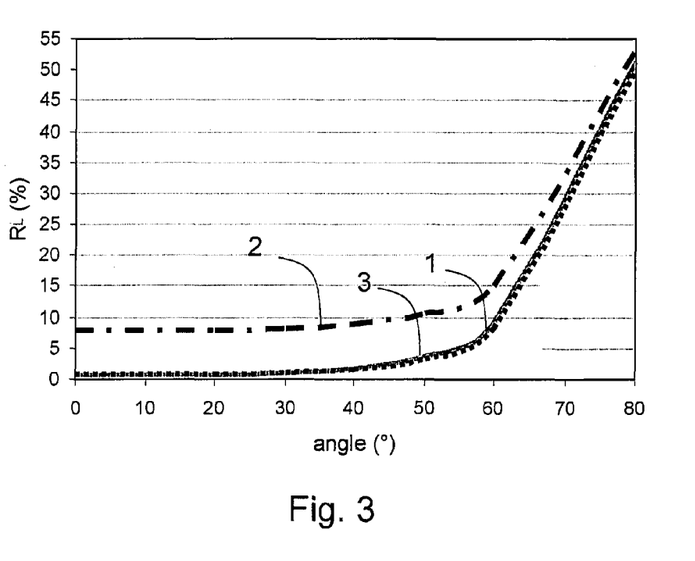
FIG. 3 illustrates the change in the light reflection as a function of the angle of observation for the substrate provided with this multilayer (curve 1), for the substrate without a multilayer (curve 2) and for the antireflection glass currently sold by Saint-Gobain Glass France under the reference Vision-Lite Plus™ (curve 3).

The calorimetric coordinates of the preceding multilayer No. 1 were measured according to the C.I.E. system. The multilayer proved particularly suitable for a building application, for which a neutral color in transmission (close to gray) is desired, the light reflection at normal incidence is close to 1% and the values of a* and b* are respectively 2 and −14, giving a slightly bluish color in reflection at an angle of incidence of 0°. The multilayer moreover has the advantage of offering a very low variation in the color in reflection according to the angle of incidence, said variation furthermore changing with the angle toward a very neutral color as is shown in table 2. FIG. 3 illustrates the change in the light reflection as a function of the angle of observation for the substrate provided with this multilayer (curve 1), for the substrate without a multilayer (curve 2) and for the antireflection glass currently sold by Saint-Gobain Glass France under the reference Vision-Lite Plus® (curve 3). It can be seen in FIG. 3 that the optical properties in $R_L$ of the glass substrate comprising the multilayer according to the invention are substantially equivalent to those of an antireflection glass currently sold.

TABLE 2

| Incidence | $R_L$ (%) | a* | b* | Color |
|---|---|---|---|---|
| 0° | 1.1 | 2 | −14 | Slightly blue |
| 20° | 1.1 | 1 | −11 | Slightly blue |
| 30° | 1.2 | 0 | −8 | Neutral |
| 40° | 1.7 | 0 | −3 | Neutral |
| 50° | 3.4 | 0 | 0 | Neutral |

TABLE 2-continued

| Incidence | $R_L$ (%) | a* | b* | Color |
|---|---|---|---|---|
| 60° | 8.3 | 0 | 0 | Neutral |
| 80° | 50.0 | 0 | 0 | Neutral |

However, the color of the glazing in transmission was neutral ($a^*_{trans}=-1.5$, $b^*_{trans}=1.5$).

Example 2

The calorimetric coordinates of the multilayer No. 2 from table 1 were measured according to the C.I.E. system. The light reflection under normal incidence was this time around 1.5%, a condition suitable for building applications. The values of a* and b* in reflection under normal incidence were respectively −1 and −4, resulting in a color in reflection at normal incidence that was almost neutral, which tended toward absolute neutral when the angle of observation increased, as is shown in table 3 below.

TABLE 3

| Incidence | $R_L$ (%) | a* | b* | Color |
|---|---|---|---|---|
| 0° | 1.5 | −1 | −4 | Neutral |
| 20° | 1.5 | 0 | −4 | Neutral |
| 30° | 1.7 | 1 | −2 | Neutral |
| 40° | 2.4 | 0 | 0 | Neutral |
| 50° | 4.4 | −1 | 1 | Neutral |
| 60° | 9.5 | −1 | 1 | Neutral |
| 80° | 50.8 | 0 | 0 | Neutral |

The color of the glazing in transmission was neutral ($a^*_{trans}=-1.3$, $b^*_{trans}=0.8$).

Example 3

The calorimetric coordinates of the multilayer No. 3 from example 1 were measured according to the C.I.E. system. The light reflection under normal incidence was close to 2.0%. The values of a* and b* in reflection under normal incidence were respectively −2 and 0, resulting in an extremely neutral color in reflection, which furthermore remained practically unchanged when the angle of observation increased, as is shown in table 4:

TABLE 4

| Incidence | $R_L$ (%) | a* | b* | Color |
|---|---|---|---|---|
| 0° | 2.0 | −2 | 0 | Neutral |
| 20° | 2.2 | −2 | 0 | Neutral |
| 30° | 2.5 | −2 | 1 | Neutral |
| 40° | 3.3 | −1 | 1 | Neutral |
| 50° | 5.3 | 0 | 0 | Neutral |
| 60° | 10.5 | 1 | 0 | Neutral |
| 80° | 51.5 | 0 | 0 | Neutral |

The color of the glazing in transmission was neutral ($a^*_{trans}=-1.3$, $b^*_{trans}=0.8$).

Example 4

The calorimetric coordinates of the multilayer No. 4 were measured according to the C.I.E. system. The light reflection under normal incidence was close to 1.7%. The values of a* and b* in reflection under normal incidence were respectively −10 and −3, resulting in a slightly green color in reflection, which became neutral for an angle greater than 400, as is shown in table 5:

TABLE 5

| Incidence | $R_L$ (%) | a* | b* | Color |
|---|---|---|---|---|
| 0° | 1.7 | −10 | −3 | Green |
| 20° | 1.6 | −12 | −2 | Green |
| 30° | 1.6 | −13 | −2 | Green |
| 40° | 1.9 | −10 | −3 | Green |
| 50° | 3.3 | −4 | −4 | Neutral |
| 60° | 7.7 | 0 | −4 | Neutral |
| 80° | 49.3 | 0 | −1 | Neutral |

The color of the glazing in transmission was neutral ($a^*_{trans}=-1.3$, $b^*_{trans}=0.7$).

Example 5

The calorimetric coordinates according to the C.I.E. system of the multilayer No. 5 described previously were both described in the prior Patent Application WO 04/005210. It was observed that, although the light reflection at normal incidence was slightly below that of the preceding examples, the values of a* and b* listed in table 6 give the glazing a pronounced blue-violet color, and this being regardless of the angle of incidence.

TABLE 6

| Incidence | $R_L$ | a* | b* | Color |
|---|---|---|---|---|
| 0° | <1% | 13 | −31 | Blue |
| 20° | <1% | 15 | −30 | Blue |
| 40° | <1% | 14 | −19 | Violet |

Example 6

The calorimetric coordinates of the preceding multilayer No. 6 were measured according to the C.I.E. system. The values of a* and b* listed in table 7 indicate that the color in reflection of such a glazing varies widely as a function of the angle of incidence, changing from violet to red then to yellow when the angle of incidence increases. Such characteristics prevent the use of such a glazing, for example in the building field.

TABLE 7

| Incidence | $R_L$ (%) | a* | b* | Color |
|---|---|---|---|---|
| 0° | 1.2 | 15 | −10 | Violet |
| 20° | 1.3 | 15 | −5 | Pink |
| 30° | 1.7 | 12 | 2 | Red |
| 40° | 2.7 | 7 | 9 | Orange |
| 50° | 5.0 | 1 | 13 | Yellow |
| 60° | 10.3 | −3 | 10 | Yellow |
| 80° | 51.3 | −2 | 2 | Neutral |

Example 7

The substrate equipped with the multilayer No. 1 from example 1 was made to undergo a heat treatment consisting of heating to a temperature of 640° C. followed by a toughening operation. Table 8 allows the direct comparison of the optical properties of the glazing before and after the heat treatment:

TABLE 8

| Incidence | $R_l$ (%) before | $R_l$ (%) after | a* before | a* after | b* before | b* after |
|---|---|---|---|---|---|---|
| 0° | 1.1 | 1.0 | 2 | 2 | −14 | −16 |
| 20° | 1.1 | 0.9 | 1 | 1 | −11 | −14 |
| 30° | 1.2 | 1.0 | 0 | 2 | −8 | −11 |
| 40° | 1.7 | 1.5 | 0 | 2 | −3 | −6 |
| 50° | 3.4 | 3.2 | 0 | 2 | 0 | −3 |
| 60° | 8.3 | 8.2 | 0 | 1 | 0 | −1 |
| 80° | 50.0 | 49.9 | 0 | 0 | 0 | 0 |

In the L*, a*, b* calorimetry system and under normal incidence, the color variation linked to the heat treatment has been quantified by using the quantity ΔE conventionally used and defined by the equation:

$$\Delta E = \sqrt{(\Delta a^*)^2 + (\Delta b^*)^2 + (\Delta L^*)^2}$$

In this example, the quantity ΔE is less than 3, which proves that the substrate coated with such a multilayer can undergo a heat treatment followed by a toughening operation without its optical properties being substantially modified. Similar results have been obtained for the other multilayers 2 to 4 according to the invention.

Example 8

The mechanical strength of the multilayers according to the invention were measured by Taber tests of abrasion and scratch resistance.

The operation principle of a device that makes it possible to carry out a Taber test is recalled hereinbelow.

Two abrasive grinding wheels loaded to 250 g rest on a test specimen positioned horizontally on a turntable. A greater bearing load (up to a total of 1 kg) may be set according to the test. As the specimen rotates, the grinding wheels turn in opposite directions on a 30 cm² annulus, and do so twice for each rotation.

The abrasion resistance test comprises three steps:
a step of cleaning the grinding wheels;
the abrasion of the test specimen itself; and
a measurement of the haze caused by this abrasion.

As regards the cleaning step, this consists in positioning, in turn, in the place of the test specimen:
an abrasive (25 revolutions); and
a bare float glass (100 revolutions).

The abrasion step is carried out on a test specimen measuring 10 cm×10 cm.

The haze measurement is carried out using a BYK Gardner XL-211 turbidimeter. This apparatus is used to measure the haze on the impression left by the Taber test grinding wheel during abrasion via a quantity ΔH obtained in the following manner:

ΔH=(total transmission of the test specimen/transmission diffused by the test specimen)×100.

For the application targeted in the present application, the following operating conditions are used: grinding wheel: CS 10 F; load: 500 g; 650 revolutions.

For the multilayers that are the subject of examples 1 to 4, the ΔH value measured after the Taber test is still below 3%. The same multilayers having undergone a toughening operation, such as described in example 7, also have a ΔH value that is still below 3%, measured after the same Taber test and therefore also have a very good mechanical strength.

Example 9

A four-layer antireflection multilayer No. 7 was synthesized on both faces of the same Planilux® glass substrate, according to the same procedure as explained previously. The multilayer was the following, starting from the glass substrate:

| layer 1: | $SnZn_2O_4$ | index $n_1$ = 2.05 |
| layer 2: | $SiO_2$ | index $n_2$ = 1.48 |
| layer 3: | $SnZn_2O_4$ | index $n_3$ = 2.05 |
| layer 4: | $SiO_2$ | index $n_4$ = 1.48 |

Table 9 below gives the geometrical thicknesses $e_i$, in nanometers, of each of the layers i forming the multilayer No. 7:

TABLE 9

| Multilayer | $e_1$ (nm) | $e_2$ (nm) | $e_3$ (nm) | $e_4$ (nm) | $e_3 + e_1$ (nm) |
|---|---|---|---|---|---|
| 7 | 14 | 35 | 124 | 87 | 138 |

Bending tests carried out on the substrate equipped with the multilayer 7, based on $SnZn_2O_4$ and on $SiO_2$, showed that the multilayer could undergo heat treatment and that, in particular, it could be toughened and bent. No optical defect appeared for radii of curvature of around 1 m. The haze measured after bending according to the method described previously, in the area of greatest curvature, was less than ΔH=6%.

Example 10

Comparative

In this example, the optical qualities of the anti-reflection multilayer described in example 1 of Patent Application FR 2748743 were evaluated.

The substrate comprised, on one of its faces, a multi-layer comprising successive layers having indices and geometrical thicknesses similar to those of the multilayer No. 1 described previously. The other face was covered with a three-layer multilayer very different from the multilayers according to the invention.

According to this example, the multilayer on the substrate was the following:

| | Succession of layers | | | | | | |
|---|---|---|---|---|---|---|---|
| | SiOAlF / $TiO_2$ | $SiO_xC_y$ | Glass | $SnO_2$ | $SiO_2$ | $Nb_2O_5$ | $SiO_2$ |
| Index | 1.48 | 2.45 | 1.73 | 1.9 | 1.45 | 2.1 | 1.45 |
| Geometrical thickness (nm) | 90 | 99 | 71 | 18 | 35 | 120 | 85 |

The calorimetric coordinates of this glazing according to the prior art were measured using the C.I.E. system. The values of a* and b* listed in table 10 indicate that the color of such a glazing in reflection varies greatly as a function of the angle of incidence, changing from blue to red then to yellow when the angle of incidence increases.

TABLE 10

| Incidence | $R_L$ (%) | a* | b* | Color |
|---|---|---|---|---|
| 0° | 0.8 | 3 | −18 | Blue |
| 20° | 0.7 | 5 | −17 | Blue-violet |
| 30° | 0.7 | 6 | −15 | Blue-violet |
| 40° | 1.0 | 8 | −10 | Violet |
| 50° | 2.6 | 6 | −3 | Red |
| 60° | 7.4 | 3 | 1 | Red |
| 80° | 49.4 | 0 | 3 | Yellow |

The invention claimed is:

1. A transparent substrate comprising an antireflection coating made of a thin-film multilayer (A) of dielectric material with alternately high and low refractive indices, wherein the multilayer successively comprises, starting from the surface of the substrate:

a high-index first layer (1) having a refractive index $n_1$ of between 1.8 and 2.2 and a geometrical thickness $e_1$ of between 10 and 25 nm;

a low-index second layer (2) having a refractive index $n_2$ of between 1.40 and 1.55 and a geometrical thickness $e_2$ of between 20 and 50 nm;

a high-index third layer (3) having a refractive index $n_3$ of between 1.8 and 2.2 and a geometrical thickness $e_3$ of between 110 and 150 nm; and a low-index fourth layer (4) having a refractive index $n_4$ of between 1.40 and 1.55 and a geometrical thickness $e_4$ of between 60 and 95 nm, the algebraic sum of the geometrical thicknesses $e_3+e_1$ being between 125 and 160 nm, in that said multilayer (A) does not have a Zr dopant and in that said multilayer is present on at least one of the faces of said substrate, the other face being bare, covered with another coating having another functionality, or covered with another antireflection multilayer (A), wherein the high-index first layer (1), the high-index third layer (3) or both are based on silicon nitride, aluminum nitride, mixed tin/zinc oxide, mixed zinc/titanium oxide, silicon/titanium oxide, or a combination thereof.

2. The substrate as claimed in claim 1, in which $e_1$ is between 12 and 20 nm.

3. The substrate as claimed in claim 1, in which $e_2$ is between 25 and 40 nm.

4. The substrate as claimed in claim 1, in which $e_3$ is between 115 and 135 nm.

5. The substrate as claimed in claim 1, in which $e_4$ is between 75 and 95 nm.

6. The substrate as claimed in claim 1, in which the algebraic sum of the geometrical thicknesses $e_3+e_1$ is between 130 and 155 nm.

7. The substrate as claimed in claim 1, in which the high-index first layer (1) and/or the high-index third layer (3) are formed from a superposition of several high-index layers.

8. The substrate as claimed in claim 1, in which the low-index second layer (2) and/or the low-index fourth layer (4) are based on silicon oxide, on silicon oxynitride and/or oxycarbide or on a mixed oxide of silicon and aluminum.

9. The substrate as claimed in claim 1, in which said substrate is made of clear or bulk-tinted glass.

10. The substrate as claimed in claim 1, in which the high-index third layer is made from or comprises a mixed tin/zinc or silicon/titanium oxide.

11. The substrate as claimed in claim 1, in which the high-index third layer is made from or comprises a silicon nitride.

12. The substrate as claimed in claim 1, equipped on both of its faces with said antireflection multilayer stack.

13. The substrate as claimed in claim 1, equipped on one of its faces with said antireflection multilayer stack and bare on the other face or equipped on the other face with a coating having another functionality of the solar-protection, low-emissivity, anti-soiling, anti-fogging, anti-rain or heating type.

14. A multiple glazing unit comprising at least two substrates as claimed in claim 1, in which the two glass substrates are separated by an intermediate gas-filled space or joined together using a thermoplastic sheet, in which one of said substrates is equipped on its outer face, that is to say on the face on the opposite side from the thermoplastic sheet or from the gas-filled space, with said antireflection multilayer, and in which the other substrate, on its outer face, is bare, is coated with an antireflection multilayer of the same or different nature, or is coated with a coating having another functionality of the solar-protection, low-emissivity, anti-soiling, anti-fogging, anti-rain or heating type, and/or in which said coating having another functionality is placed on one of the faces of the substrates turned toward the thermoplastic joining sheet or toward the gas-filled space.

15. An interior or exterior glazing, a display cabinet, a counter, an anti-glare computer screen, or a glass furniture comprising the substrate as claimed in claim 1.

16. An interior or exterior glazing, a display cabinet, a counter, an anti-glare computer screen, or a glass furniture comprising the multiple glazing unit as claimed in claim 14.

17. The multiple glazing unit as claimed in claim 14, wherein the said glazing unit is a double glazing unit or a glazing unit with a laminated structure.

18. The substrate as claimed in claim 8, wherein the mixed oxide of silicon and aluminum is $SiOAlF_x$.

19. The substrate as claimed in claim 7, wherein the high-index first layer (1) and/or the high-index third layer (3) are formed from a superposition of $SnO_2/Si_3N_4$ or $Si_3N_4/SnO_2$.

20. The substrate as claimed in claim 3, wherein $e_2$ is between 30 and 40 nm.

21. The substrate as claimed in claim 1, wherein $n_1$ and $n_3$ are between 1.85 and 2.15.

22. The substrate as claimed in claim 1, wherein $n_1$ and $n_3$ are between 1.90 and 2.10.

23. The transparent substrate as claimed in claim 1, wherein the substrate is a glass substrate.

24. The transparent substrate as claimed in claim 1, wherein the high-index first layer (1), the high-index third layer (3) or both are based on silicon nitride, mixed tin/zinc oxide, or a combination thereof.

* * * * *

UNITED STATES PATENT AND TRADEMARK OFFICE
CERTIFICATE OF CORRECTION

PATENT NO. : 7,910,215 B2  Page 1 of 1
APPLICATION NO. : 12/282263
DATED : March 22, 2011
INVENTOR(S) : Vincent Reymond et al.

It is certified that error appears in the above-identified patent and that said Letters Patent is hereby corrected as shown below:

Column 2, line 50, "the reference Vision-Lite Plus ™ (curve 3)."
  should read
  --the reference Vision-Lite Plus ® (curve 3).--.

Column 8, line 37, "calorimetric" should read --colorimetric--.

Column 9, line 11, "calorimetric" should read --colorimetric--;
  line 36, Table 3, Example 3: "calorimetric" should read --colorimetric--;
  line 60, Table 4, Example 4: "calorimetric" should read --colorimetric--.

Column 10, line 19, Table 5, Example 5: "calorimetric" should read --colorimetric--;
  line 39, Table 6, Example 6: "calorimetric" should read --colorimetric--.

Column 11, line 13, Table 8, "calorimetry" should read --colorimetric--.

Column 12, line 62, Example 10, "calorimetric" should read --colorimetric--.

Signed and Sealed this
Twenty-sixth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,910,215 B2 | Page 1 of 1 |
| APPLICATION NO. | : 12/282263 | |
| DATED | : March 22, 2011 | |
| INVENTOR(S) | : Vincent Reymond et al. | |

It is certified that error appears in the above-identified patent and that said Letters Patent is hereby corrected as shown below:

Column 13, line 38, Claim 1, "tin/zinc" should read --thin/zinc--.

Column 14, line 5, Claim 10, "tin/zinc" should read --thin/zinc--.

line 56, Claim 24, "tin/zinc" should read --thin/zinc--.

Signed and Sealed this

Thirteenth Day of September, 2011

David J. Kappos
*Director of the United States Patent and Trademark Office*